July 7, 1964 W. BISCHOF ETAL 3,140,357

MULTIFREQUENCY RECEIVER

Filed June 28, 1962 6 Sheets-Sheet 1

INVENTORS W. BISCHOF
T. L. DOKTOR
Z. LEGEDZA

BY [signature]

ATTORNEY

INVENTORS W. BISCHOF
T. L. DOKTOR
Z. LEGEDZA
BY [signature]
ATTORNEY

July 7, 1964 W. BISCHOF ETAL 3,140,357

MULTIFREQUENCY RECEIVER

Filed June 28, 1962

6 Sheets-Sheet 3

INVENTORS W. BISCHOF
T. L. DOKTOR
Z. LEGEDZA

BY [signature]

ATTORNEY

July 7, 1964 W. BISCHOF ETAL 3,140,357

MULTIFREQUENCY RECEIVER

Filed June 28, 1962

6 Sheets-Sheet 4

INVENTORS W. BISCHOF
T. L. DOKTOR
Z. LEGEDZA

BY [signature]

ATTORNEY

INVENTORS W. BISCHOF
T. L. DOKTOR
Z. LEGEDZA
BY [signature]
ATTORNEY

INVENTORS W. BISCHOF
T. L. DOKTOR
Z. LEGEDZA
BY
ATTORNEY

United States Patent Office 3,140,357
Patented July 7, 1964

3,140,357
MULTIFREQUENCY RECEIVER

Werner Bischof, New York, and Theodore L. Doktor, Flushing, N.Y., and Zenon Legedza, Passaic, N.J., assignors to Bell Telephone Laboratories, Incorporated, New York, N.Y., a corporation of New York Filed June 28, 1962, Ser. No. 205,989
12 Claims. (Cl. 179—84)

This invention relates generally to a multifrequency receiver and more particularly to a multifrequency receiver which is capable of reliably decoding frequency coded decimal digits in a telephone system.

The complexity and the cost of dialing equipment in a telephone office have been considerably reduced with the advent of voice frequency coded digit transmission since the same channel may be employed for both voice and digit transmission. The particular type of telephone digit transmission system now gaining widest acceptance uses the so-called 4×4 code. This code embodies two groups of frequencies which will be called, for purposes of clarity, the high frequency group and the low frequency group. Each group of frequencies comprises four individual frequencies and the concurrence of a selected pair of these frequencies, one from each group, represents a decimal digit. The generation of the frequencies representative of a particular digit may be accomplished by a generator such as the touch tone dialer, the operation of which is disclosed in the pending patent application of L. A. Meacham et al., Serial No. 759,474, filed on September 8, 1958, and assigned to the assignees of the present invention.

Attendant with the advantages of voice frequency signaling is the need for the receiver to discriminate between actual speech, or noise, signals and the code signals. If no provision is incorporated into the receiver to prevent receiver operation by these signals, which may be considered as interference insofar as the code signaling function is concerned, the results will be disastrous. That is, speech signals may cause registration of a digit and there is an even greater possibility of the transmitted digit being masked by the interfering signals. Protection against this type of operation will be referred to as talk-off protection since the prime objective is to prevent the receiver from being operated by speech or other noncode signals.

Various multifrequency receivers have been used in the past for the reception and translation of frequency coded digits and they have included arrangements for talk-off protection. For example, some receivers employ filters to detect the presence of energy directly above and below the signaling frequencies and inhibit operation of the receiver if such energy is found to lie in these "guard channels." Other types of systems require the transmission of a key pulse prior to digit transmission to make the receiver operate. All of these systems are characterized by their increased cost and complexity.

The object of this invention is to provide a reliable multifrequency receiver for decoding frequency coded digits which affords a maximum amount of talk-off protection and is characterized by simplicity of design and ease of operation.

In accordance with the above object the present invention contemplates a multifrequency receiver wherein the two frequencies which represent a digit are amplified by an input amplifier and then applied to two parallel chains. One chain detects the individual frequencies in the high frequency group and the other chain detects the individual frequencies in the low frequency group. Detection may be performed by a time domain filter, the characteristics of which are such that an output will be produced after one period of the detected frequency has been received. This output signal will be applied to one input terminal of an AND gate. The output signals from both the high and the low frequency groups will also be applied to a validity circuit which will produce an output signal only when the following conditions are met:

(1) One frequency from each group is present simultaneously;

(2) The signals are present for a predetermined interval of time; and (3) Only one signal in each group is present.

The output signal produced by the validity circuit will in turn energize the second input to the AND gate and thereupon cause a combination of AND gates to register the digit in a register.

The validity circuit of the present invention meets the requirements stated in the preceding paragraph by providing a timing circuit which is energized by an AND gate. The gate, which is connected to the output of the filters, triggers the timing circuit when there are simultaneously present two frequencies, one in each group. The gate is inhibited when more than one frequency in each group is present. If valid signals are received, the timing circuit produces the output pulse a predetermined interval of time after being operated. Hence, all three requirements are fully determined by the signal validity circuit.

A feature of this invention resides in the ability of the receiver to discern the presence of only one frequency in each group of frequencies.

Another feature of the present invention is the ability of the receiver to remain inoperative in the presence of speech or noise signals.

The present invention also includes an expedient to allow the timing mechanism (that portion of the validity circuit which checks that the signals persist for the required time interval) to completely recycle. Thus, even though the rate of signaling is high and the interdigital spacing is small, the timing interval will remain constant.

Accordingly, another feature of the present invention is to provide an accurate and reliable receiver under adverse conditions of operation.

Other features and objects of the present invention will become better understood and appreciated following the detail description taken in conjunction with the drawings wherein:

FIG. 1 is a block diagram of the basic receiver of the present invention;

FIGS. 2 and 3, when arranged from top to bottom, respectively, comprise a logic drawing showing the receiver of the present invention;

The logic units used herein are well-known to those skilled in the art and may comprise any of the devices heretofore known such as solid state devices or tubes. With the exceptions noted below, all of the circuits comprising the AND gates, OR gates, inhibitor gates, and inverters of the present invention may be found by reference to the book Pulse and Digital Circuits, by Millman and Taub, McGraw-Hill Book Company, 1956.

Figure 1:
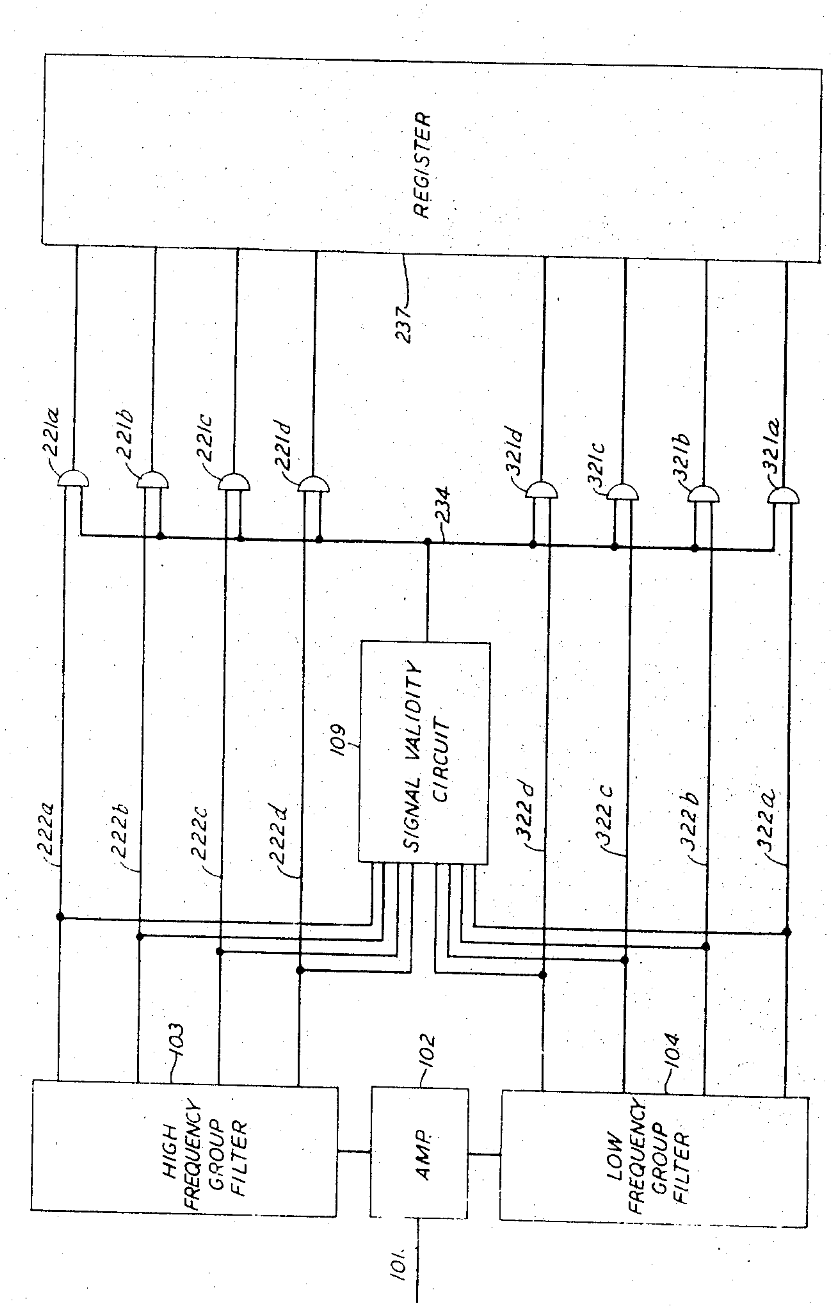

The operation of the present invention may be explained in conjunction with the basic diagram of the system as illustrated in FIG. 1. Input signals, including the coded signal possibly accompanied by noise, is received on a transmission line 101 and is fed to an input amplifier 102. The amplifier 102 is connected to the input filters 103 and 104. Filter 103 detects the individual frequencies in the high frequency group and filter 104 detects the individual frequencies in the low frequency group. Each of the filters has four output connections associated with it. Thus, the output leads 222*a*–222*d* and output leads 322*a*–322*d* are associated with filters 103 and 104, respectively. Leads 222*a*–222*d* are individually connected to one input terminal of the AND gates 221*a*–221*d*, respectively. Likewise, output leads 322*a*–322*d* are individually connected to one input terminal AND gates 321*a*–321*d*, respectively.

A signal validity circuit 109 is connected to all four output leads 222*a*–222*d* associated with filter 103 and to leads 322*a*–322*d* from filter 104. The output of the signal validity circuit is connected to the other input terminals of AND gates 221*a*–221*d* and AND gates 321*a*–321*d* by a lead 234. Each of the AND gates terminates in a register 237.

In normal operation one output lead of each filter is energized in accordance with the individual frequency received. This output signal energizes one of the input terminals to the associated AND gate. For example, suppose the two frequencies which are received cause an output signal to appear on leads 222*a* and 322*a*. These signals respectively energize one terminal of AND gate 221*a* and one terminal of AND gate 321*a*. Furthermore, validity circuit 109 operates. At the end of a predetermined time interval, output lead 234 of circuit 109 is energized thereby energizing the second input terminal to AND gates 221*a* and 321*a*. Hence, an output signal is produced by both these AND gates and causes register 237 to register the decimal digit represented by the two frequencies received.

The logic circuit components will now be described in greater detail utilizing the illustrative embodiment shown in FIG. 2 and FIG. 3. The input signals are received by an input amplifier 102. The output of amplifier 102 is connected to a high frequency group bandpass filter 202 and a low frequency group bandpass filter 302 by the leads 203 and 303, respectively. Filter 202 only passes those individual frequencies in the high frequency group whereas filter 302 only passes those individual frequencies in the low frequency group.

The output of filter 202 is connected to a high frequency group delay line 204 and to a common-amplifier limiter 205 by a lead 206. The output of filter 302 is connected to a low frequency group delay line 304 and a common amplifier-limiter 305 by a lead 306. The delay lines are part of the filtering arrangement denoted 103 and 104, respectively, in FIG. 1 and indicated in more detail by the dotted boxes 103 and 104 in FIGS. 2 and 3, respectively. These filters are of the time domain type which are characterized by the fact that an output will be produced after the reception of one period of the desired frequency. This type of filter is particularly advantageous in the receiver disclosed because of the speed of their operation. However, the invention is not to be thought of as being limited to the type of filtering arrangements disclosed in the illustrative embodiment. The delay lines represented by the circuit elements 204 and 304 are conventional delay lines each having four taps thereon. Each tap is so placed so that the time interval it would take for a wave to propagate down the line to that individual tap will be equal to the period of one of the frequencies in that particular group of frequencies. Each tap is connected to the input of an amplifier-limiter circuit. Thus, the four taps associated with high frequency group delay line 204 are individually connected to the amplifier-limiters 207*a*–207*d*, respectively. Likewise, the four taps on low frequency group delay line 304 are individually connected to the input of the amplifier-limiters 307*a*–307*d*, respectively. Amplifier-limiters 205 and 207*a*–207*d* and 305 and 307*a*–307*d* may be of the type disclosed in the pending patent application by O. J. Murphy, Serial No. 138,221, filed on September 11, 1961, and assigned to the assignees of the present invention and may comprise an amplifier incorporating biased diodes connected in series in negative feedback paths and a low pass filter which is connected between the amplifier output terminals and the diode terminals which are remote from the amplifier output terminals. Thus, limiting symmetry is obtained in spite of changes in the average value of the amplifier output because both terminals of both diodes are at the same voltage.

Amplifier-limiter 205 is connected to a further limiting stage 239. Amplifier-limiters 207*a*–207*d* are individually connected to the limiters 211*a*–211*d*, respectively. Similarly, amplifier-limiter 305 is connected to a limiter 339 and the amplifier-limiters 307*a*–307*d* are individually connected to the limiters 311*a*–311*d*, respectively. These limiters may be of the diode clipping type although the invention is not limited to this specific arrangement.

Limiters 211*a*–211*d* are individually connected to the input terminals of the conventional monostable multivibrators 212*a*–212*d*, respectively, and limiter 239 is connected to a monostable multivibrator 216. The output of limiters 311*a*–311*d* are individually connected to the monostable multivibrators 312*a*–312*d*, respectively, and limiter 339 is connected to monostable multivibrator 316. The output of multivibrators 212*a*–212*d* are individually connected to one input terminal of the two terminal AND gates 217*a*–217*d*, respectively. The monostable multivibrators 312*a*–312*d* are individually connected to one input terminal of the two terminal AND gates 317*a*–317*d*, respectively. The second terminals of AND gates 217*a*–217*d* are connected to the output of multivibrator 216 by a lead 218. The second input terminals of AND gates 317*a*–317*d* are connected to the output of multivibrator 316 by a lead 318. The operation of these aforementioned AND gates is well known in the art. (That is, an AND gate will produce an output signal only when both input leads are energized simultaneously.)

The operation of the time domain filtering network of the present invention will be explained in conjunction with FIGS. 4A–4F. Since the operation of the high frequency group time domain filter is the same as the low frequency group time domain filter only the operation of filter 103 will be described. Furthermore, it is assumed that the frequency being detected is that frequency associated with amplifier-limiter 207*a* and will be denoted $f_1$ in this example.

Figures 4A, 4B, 4C, 4D, 4E, 4F:
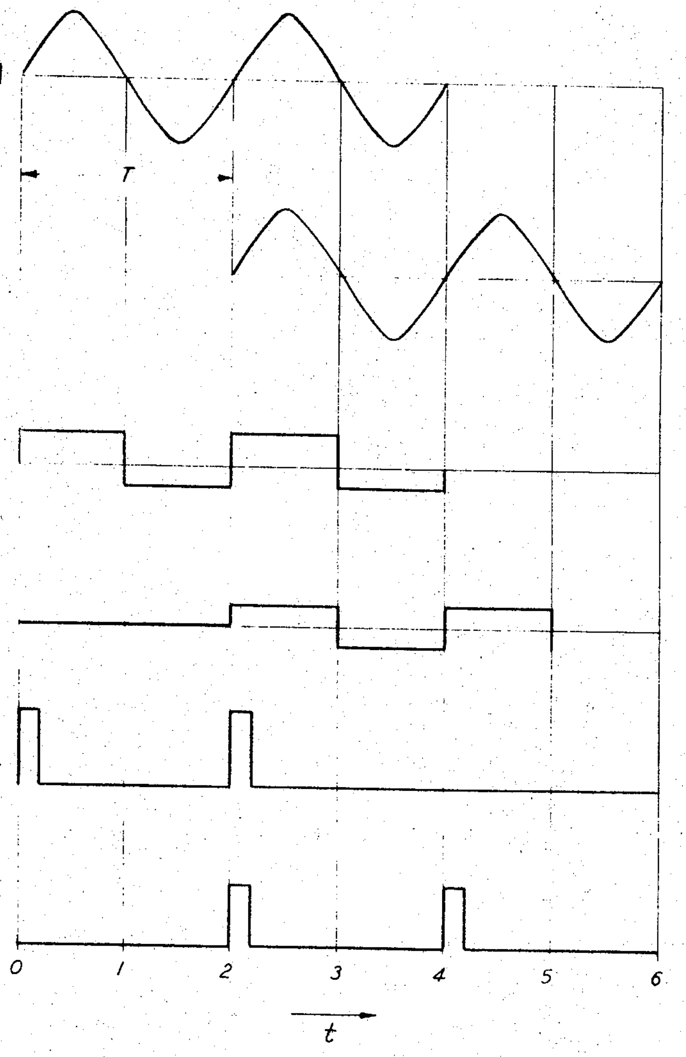
FIGS. 4A–4F illustrate the waveforms of the time domain filter portion of the invention illustrated in FIGS. 2 and 3.

The frequency $f_1$ will be amplified by amplifier 102 and passed through filter 202. The waveform of this frequency is shown in FIG. 4A. One period of this wave is denoted by the letter "T." This waveform will be applied as an input signal to amplifier-limiter 205. The waveform will also be applied to delay line 204 and will propagate down the delay line and, since the tap associated with amplifier-limiter 207*a* is placed at that point on the delay line which corresponds to the delay of one period for frequency $f_1$, will emerge as the input to 207*a* with the delay illustrated in FIG. 4B. The waveforms will then pass through amplifier-limiters 207*a* and 205 and their associated limiters 211*a* and 239 and will appear at the input terminals of monostable multivibrators 212*a* and 216 in the shape shown in FIGS. 4D and 4C, respectively. The second limiting stages insure that the trigger pulses will be square waves. It is to be noted that the input to multivibrator 212*a* is delayed exactly one period. The monostable multivibrators will be triggered by the pulses appearing at their respective input terminals and will thereupon produce an output pulse and energize the AND gate terminals connected to their respective output terminals. However, the only time both input terminals of a particular AND gate will be energized will be that point in time at which the pulses produced by any of multivibrators 212*a*–212*d* correspond in time to the pulse produced by multivibrator 216. In the case selected for this example the output of multivibrator 216 will appear as shown in FIG. 4E while the output of multivibrator 212*a* will appear as shown in FIG. 4F. Hence, it is to be seen that AND gate 217*a* will be energized at the time indicated by point 2 in FIG. 4F since both input terminals to gate 212*a* will be energized at this instant.

Although an output signal will appear at each of the other taps along delay line 204 it is to be noted that the pulses produced by signals appearing at these taps by virtue of the operation of either multivibrator 212*b*, 212*c* or 212*d* will not correspond in time to the pulse produced by multivibrator 216 and therefore the other individual AND gates (212*b*–212*d*) will not be energized. It is further to be noted that the bandwidth of this filter (103) may be adjusted by preselecting the pulse width produced by the multivibrators since any overlap between the pulse produced by either of the multivibrators 212*a*–212*d* and the multivibrator 216 will energize an AND gate.

Each AND gate 217*a*–217*d* is individually connected to the monostable multivibrators 219*a*–219*d*, respectively. Similarly, AND gates 317*a*–317*d* are individually connected to monostable multivibrators 319*a*–319*d*, respectively. Multivibrators 219*a*–219*d* are individually connected to the integrating networks 220*a*–220*d*, respectively. Likewise, multivibrators 319*a*–319*d* are individually connected to the integrating networks 320*a*–320*d*, respectively. The output terminal of integrators 220*a*–220*d* is individually connected to one input terminal of the AND gates 221*a*–221*d*, respectively, by the leads 222*a*–222*d*, respectively. The output terminal of integrators 320*a*–320*d* is individually connected to one input terminal of the AND gates 321*a*–321*d*, respectively, by the leads 322*a*–322*d*, respectively.

Figure 7:
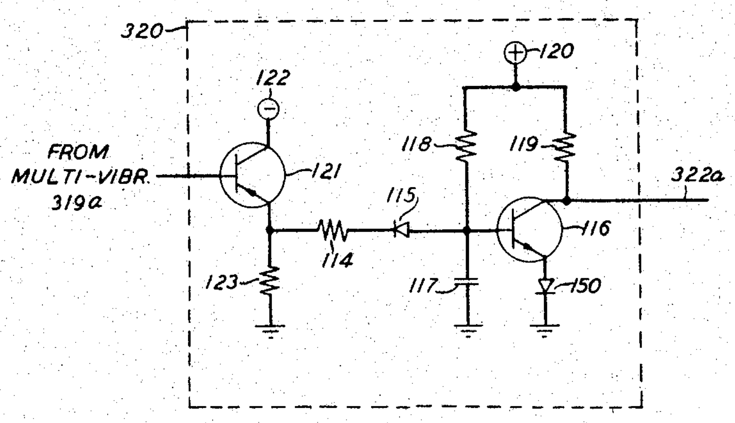
FIG. 7 illustrates the circuit diagram of the integrating networks shown in FIGS. 2 and 3.

One integrating network which is representative of integrating networks 220*a*–220*d* and 320*a*–320*d* is shown in FIG. 7. For example, the output terminal of monostable multivibrator 319*a* is connected to the base of a transistor 121 (which is connected in the emitter follower configuration). A negative source of potential 122 is connected to the collector of transistor 121. The emitter of transistor 121 is connected, through resistor 123, to ground and to the series circuit of resistor 114 and diode 115. The anode of diode 115 is connected to the base of a transistor 116, capacitor 117, and resistor 118. The other terminal of capacitor 117 is connected to ground. The collector of transistor 116 is connected through a resistor 119 to a voltage source 120. Voltage source 120 is also connected to resistor 118. The emitter of transistor 116 is connected to the anode of a diode 150, the cathode of which is connected to ground. Lead 322*a* is connected to the collector of transistor 116.

The time during which the monostable circuit 319*a* remains in its astable state is so chosen as to be nearly equal to the period of the signaling frequency associated with it. When a negative pulse from multivibrator 319*a* is applied to the base of transistor 121 the transistor begins conducting. Hence, the emitter of transistor 121 drops to a voltage which is approximately equal to that of source 122. This will cause capacitor 117 to charge to a negative voltage in a relatively short time as determined by the values of resistor 114 and capacitor 117. This negative voltage remains practically constant during the duration of the pulse and therefore keeps transistor amplifier 116 cut off. Hence, the output potential on lead 322*a*, during the time 116 is not conducting, will be approximately equal to the voltage of source 120.

Figures 5A, 5B, 5C, 6A, 6B, 6C, 6D:
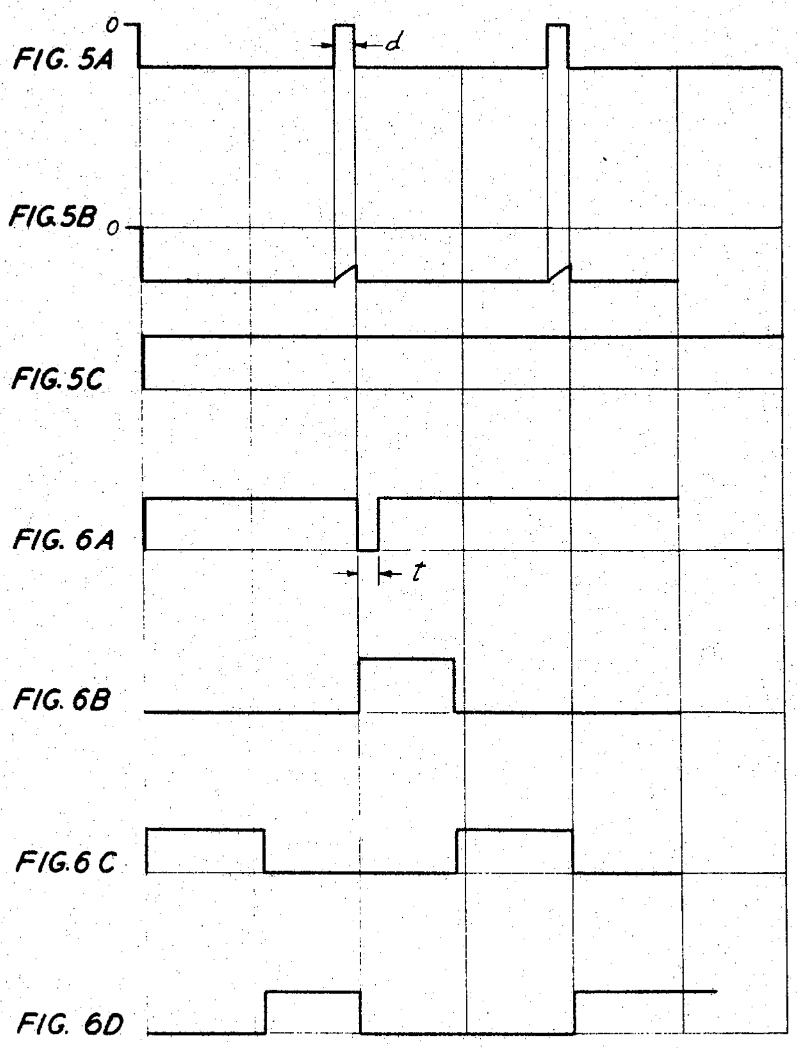
FIGS. 5A–5C illustrate the waveforms in the pulse stretching portion of FIGS. 2 and 3.
FIGS. 6A–6D illustrate waveforms in the signal validity circuit of the receiver shown in FIG. 2.

The waveforms depicted in FIGS. 5A–5C more fully clarify the operation of the integrating network. The negative going waveform of FIG. 5A is produced by one of the monostable multivibrators (such as 319*a* in this example). The waveform applied to the base of transistor 116 due to the action of capacitor 117 and resistor 114 will appear as shown in FIG. 5B. The output waveform on lead 322*a* will appear as shown in FIG. 5C. That is, due to the slow discharge time of capacitor 117 through resistor 118 (there is no discharge through 114 due to the high impedance presented by 115), the bias on the base of transistor 116 will keep the amplifier cut off until the next pulse occurs. At this time the bias will again increase to the absolute value of source 122. It is to be noted therefore that even though there will be an interval of time such as *d* in FIG. 5A wherein the multivibrator 319*a* reverts back to its normal state thereby removing the bias on transistor 121 and allowing it to conduct, the output of integrating circuit 320*a* will remain constant. (Diode 120 has been included in the circuit to prevent a breakdown from the base of transistor 116 to ground due to the negative voltage step at the base.) Since the interdigital width "*d*" may be small it would be advantageous to use a multivibrator with a fast recovery feature such as that disclosed in Patent 2,827,574, issued to S. Schneider on March 18, 1958.

As noted hereinabove the multifrequency receiver will operate only if three requirements are met. The first requirement is that only one signal from each group shall be present simultaneously. Furthermore, both signals have to be present simultaneously for a predetermined interval of time. The third requirement is that only one signaling frequency be present in the high and low frequency groups. These requirements are met by the signal validity circuit 109 in FIG. 1, the elements of which are shown in detail within the dotted box 109 in FIG. 2.

Leads 222*a*–222*d* are connected to the input terminals of an OR gate 223 and a summing amplifier 224. An OR gate will produce an output signal when one or more input terminals are energized. The output terminal of summing amplifier 224 is connected to an inverter 225, the output terminal of which is connected to one terminal of an AND gate 226. Leads 322*a*–322*d* are connected to the input terminals of an OR gate 323 and a summing amplifier 324. Summing amplifier 324 is also connected to the input terminal of an inverter 325, the output terminal of which is connected to another terminal of AND gate 226. The output of OR gate 223 is connected to an input terminal of gate 226 and to one input terminal of an AND gate 227. An inverter 238 is connected to the output terminal of gate 227. The output terminal of OR gate 323 is connected to another input terminal of gate 226 and to the other input terminal of gate 227.

Figure 8:
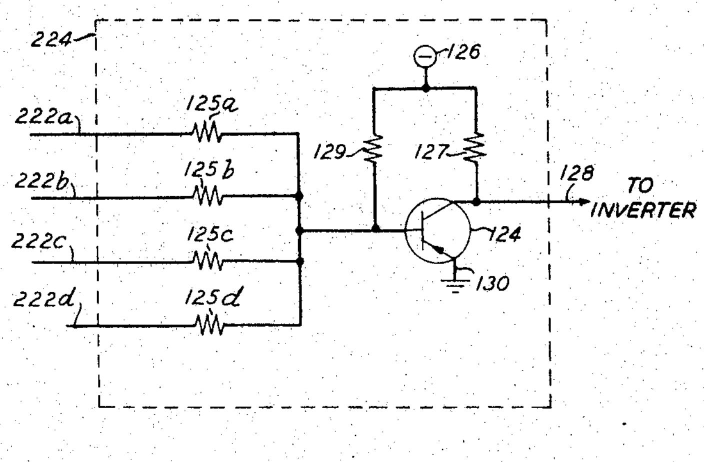
FIG. 8 illustrates the circuit diagram of the summing amplifiers shown in FIG. 2.

The summing amplifiers 224 and 324 will produce an output when two or more of the input leads are energized and may be constructed as shown in FIG. 8. In this circuit configuration leads 222*a*–222*d*, for example, are individually connected to the base of a transistor 124 through the resistors 125*a*–125*d*, respectively. The collector of transistor 124 is connected to a negative source of potential 126, through a resistor 127, and to the inverter 225 by a lead 128. The base of transistor 124 is likewise connected to source 126 through a resistor 129. The emitter of transistor 124 is connected to ground by a lead 130. The values of resistors 125*a*–125*d* and the value of the biasing source is so chosen so in the normal state the transistor will be conducting. However, if two or more of the leads 222*a*–222*d* are energized the transistor will become cut off and the potential on lead 128 will therefore be equal to approximately the value of source 126, thereby energizing inverter 225.

Figure 2:
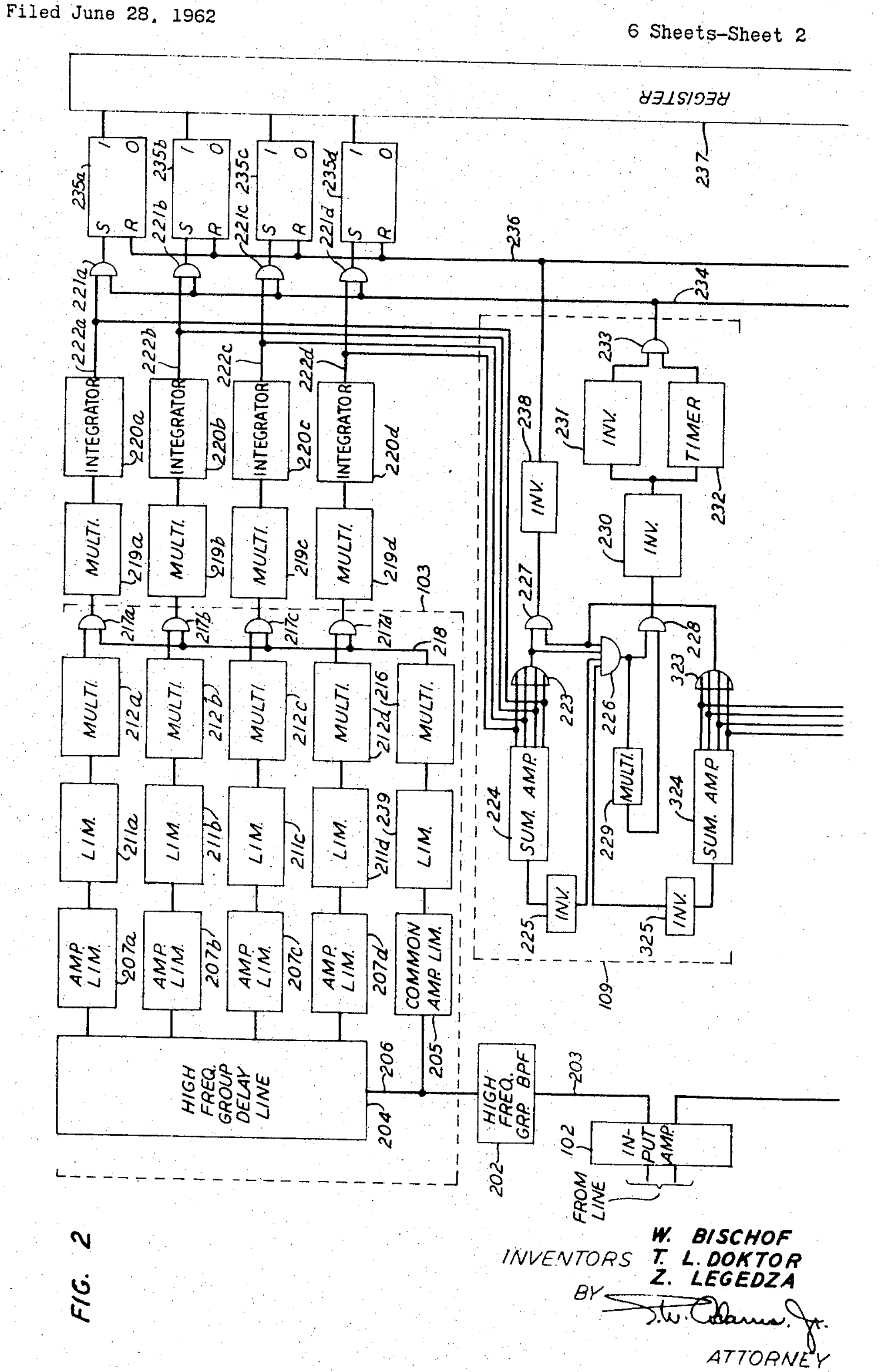
Figure 3:
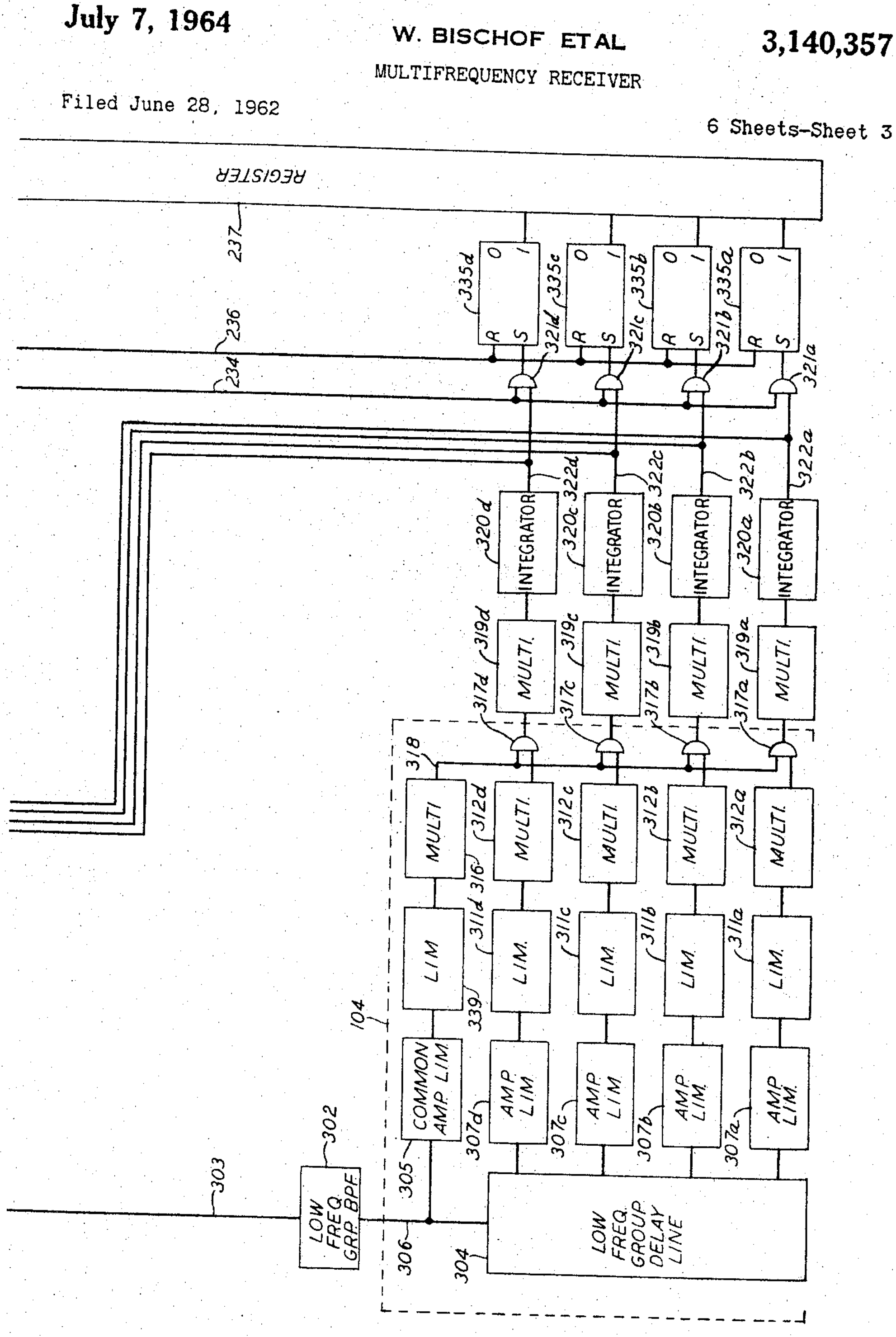

The output of AND gate 226 in FIG. 2 is connected to one terminal of an AND gate 228 and to the input terminal of a monostable multivibrator 229. The output terminal of multivibrator 229 is connected to the other input terminal of AND gate 228. The output terminal of AND gate 228 is connected to an inverter 230. The output terminal of inverter 230 is connected to the input terminal of an inverter 231 and the monostable multivibrator timer 232. (This timing circuit may be of the type disclosed in the aforementioned patent to S. Schneider.) The output of inverter 231 is connected to one input terminal of an AND gate 233, the other input terminal of which is connected to the output terminal of timer 232. The output terminal of AND gate 233 is connected to the second input terminals of AND gates 221*a*–221*d* and 321*a*–321*d* by a lead 234.

The output terminals of AND gates 221*a*–221*d* are individually connected to the set terminals of the conventional flip-flops or bistable multivibrators 235*a*–235*d*, respectively. Likewise, the output terminals of AND gates 321*a*–321*d* are individually connected to the set terminals of flip-flops 335*a*–335*d*, respectively. The reset terminals of flip-flops 235*a*–235*d* and 335*a*–335*d* are connected to the output terminal of inverter 238 by a lead 236. When the set terminal of any of the aforementioned flip-flops is energized the output lead of that individual flip-flop will likewise be energized. When the reset terminal of a particular bistable multivibrator is energized the output lead of that individual flip-flop will be de-energized.

The output leads of flip-flops 235*a*–235*d* and 335*a*–335*d* are connected to register 237. This register may be similar to the register described in Patent 2,564,441, issued to B. McKim et al. on August 14, 1951, and assigned to the assignees of the present invention. The operation of this register is as follows: When the output leads of two flip-flops (one from the high and one from the low frequency group) are energized, a decimal digit will be caused to register within the register. The various combinations of operated flip-flops will represent the digits from zero to nine.

An illustrative embodiment of the present invention, having been disclosed, the operation of the receiver will now be described. It is assumed that the circuit is in normal operation and therefore only one frequency from the high and one frequency from the low frequency group is received simultaneously and further these frequencies are associated with leads 222*a* and 322*a*, respectively. As noted in the preceding paragraphs, the continuous reception of these frequencies is detected by filters 103 and 104 causing operation of multivibrators 219*a* and 319*a*, respectively, and integrators 220*a* and 320*a*, respectively. This action produces a pulse on leads 222*a* and 322*a*, respectively, of the shape shown in FIG. 5C. Since one input terminal of OR gates 223 and 323 will be energized, the OR gates will produce output pulses to thereby energize the respective terminals of gate 226. Furthermore, the remaining terminals of gate 226 (i.e., those associated with inverters 225 and 325) will be energized by the action of the respective inverter. That is, since one input only is energized in each group, summing amplifiers 224 and 324 will not produce an output signal. Therefore, gate 226 will remain operative. It is further to be noted that both inputs to OR gate 227 are energized thereby energizing the input to inverter 238 which causes output lead 236 to remain de-energized. Hence, the reset terminals of the flip-flops will be de-energized.

The energization of the input terminals of gate 226 causes an output signal to appear which energizes one terminal of AND gate 228. Normally the output lead of multivibrator 229 will be energized since this multivibrator is only operated when gate 226 is turned off (i.e., multivibrator 229 is triggered by the trailing edge of the pulse produced by gate 226). Hence gate 228 produces an output signal as soon as an output signal is produced by gate 226. The output of gate 228 is applied through inverter 230, to inverter 231 and timer 232. The output of inverter 231 energizes one input terminal to AND gate 233 and, after monostable multivibrator timer 232 returns to its normal state, the other input terminal to AND gate 233 is energized thereby causing lead 234 to be energized. The energizing of lead 234 causes AND gates 221*a* and 321*a* to operate, since both input terminals to these AND gates are energized, thereby setting the flip-flops 235*a* and 335*a* associated with these AND gates. This will cause the digit represented by the detected frequencies to be registered in register 237.

If one or more of the detected frequencies vanish AND gate 227 will be de-energized thereby causing inverter 238 to energize lead 236 and reset all the flip-flops. Hence, it is seen that the first requirement has been met. That is, that the signals must be present simultaneously for a predetermined interval of time (as determined by the pulse length produced by circuit 232) before AND gates 221*a*–221*d* and 321*a*–321*d* will be energized to set the respective flip-flops.

When only one frequency is detected, whether it be found in either the high frequency group or the low frequency group, gate 226 will not operate since one input will be deenergized. That is, either OR gate 223 or 323 will not produce an output. Therefore, the second requirement that at least one frequency from each group be present simultaneously is met.

If two frequencies from one group are present simultaneously, due to speech or noise signals or some other type of interference, the following operation takes place. (It is now assumed that lead 222*b* is energized in addition to leads 222*a* and 322*a*.) It should be noted that if a time domain filter arrangement is used to detect the individual frequencies in each group, the filter may actually prevent the energization of the output leads since the beat frequency produced by the two individual frequencies may have a period which is different than the period of any individual frequency. The energization of leads 222*a* and 222*b* causes operation of gate 223 which, in turn, energizes one input terminal to gate 226. Since two input terminals of summing amplifier 224 are energized, an output signal will be produced thereby causing inverter 225 to remove the output signal applied to the associated terminal of gate 226. This action renders gate 226 inoperative thereby de-energizing the associated input terminal of AND gate 228 and rendering timer 232 inoperative. Hence, AND gates 221*a*–221*d* and 321*a*–321*d* will remain inoperative since lead 234 will remain deenergized. This same operation will occur in the low frequency group if more than one frequency is simultaneously detected in this group. Thus it is seen that the third requirement (i.e., that the circuit remain inoperative if more than one frequency is simultaneously present in each group) has been met by the circuit of the precsnt invention.

Since the timing cycle, as determined by the pulse width produced by circuit 232 can be as long as possible depending upon the performance and reliability required of the system, the resulting duty ratio of the system can become very high for a high signaling speed and a small interdigital space. Therefore, if the next pulse occurs in a time interval which is shorter than the interval timer 232 required to attain its normal state, the timing cycle will not be accurate. That is, if the voltages on the various circuit elements comprising timer 232 have not attained their normal levels before the next pulse is received the timing interval (i.e., the pulse width produced by the circuit) will be shorter than the normal time interval. This type of operation is prevented by the inclusion of monostable multivibrator 229.

The pulse width of the pulse produced by multivibrator 229 is made to be slightly greater than the time required for timer 232 to recycle. As noted above, in the normal state the output of multivibrator 229 will cause the second terminal of AND gate 228 to be energized. When the trailing edge of the pulse produced by inhibitor 226 occurs, multivibrator 229 will operate at which time the output of AND gate 228 is de-energized (since both input terminals are now de-energized). If the next pulse produced by inhibitor gate 226 occurs within the time interval that timer 232 requires to recycle only one input terminal to AND gate 228 will be energized. The other terminal (that connected to 229) will not be energized until multivibrator 229 returns to its normal state (i.e., since gate 228 is an AND gate, both terminals must be energized before the gate will produce an output signal). Thus, an accurate timing cycle is maintained at all times by the use of multibrator 229 and AND gate 228.

What is claimed is:

1. A multifrequency receiver capable of receiving different groups of frequencies wherein the concurrence of one frequency from each of two groups discretely represents a decimal digit comprising two parallel chains, detection means in each of said chains to detect the individual frequencies in a different one of said groups, a plurality of second means in each of said chains capable of producing an output pulse when the input terminals are energized, timing means adapted to be operated by the simultaneous presence of one individual frequency from each group, means connecting said timing means to each detection means and said plurality of second means in each chain, means further connecting said plurality of second means individually to the respective detection means in that chain, each detection means being adapted to energize one terminal of a different one of said plurality of second means in response to the detection of a different one of said individual frequencies, said timing means energizing the other input terminal of said plurality of second means a predetermined time after being operated, a register adapted to register a decimal digit upon the concurrence of an output signal from one of said plurality of second means in each of said chains, and means connecting said register to said plurality of second means.

2. A multifrequency receiver capable of receiving different groups of frequencies wherein the concurrence of one frequency from each of two groups discretely represents a decimal digit comprising two parallel chains, each of said chains containing means to detect the individual frequencies in a different one of said groups, a first group of gating means associated with the respective frequency detecting means of one of said chains and a second group of gating means correspondingly associated with the frequency detecting means of the other of said chains, each of said gating means having a first and a second input terminal, each of said first terminals being connected to the respective frequency detecting means and adapted to be energized by the associated frequency detecting means individually in response to the corresponding one of said frequencies in the respective group of frequencies, timing means to detect the existence of said frequencies for a predetermined interval of time, means connecting said timing means to the outputs of each of said frequency detecting means and each of said second terminals, means interposed between said timing means and each of said frequency detecting means and adapted to operate said timing means upon concurrence of said frequencies, said timing means being adapted to energize said second terminals a predetermined interval after being operated, said gating means producing an output signal when said first and second terminals are energized, a register adapted to register a decimal digit upon the concurrence of an output signal from one gating means in each of said groups of gating means, and means connecting said register to said groups of gating means.

3. A multifrequency receiver for receiving different groups of frequencies wherein the concurrence of one frequency from each of two groups discretely represents a decimal digit comprising two parallel chains, each of said chains containing frequency determining means therein to detect the individual frequencies in a different one of said groups of frequencies, said frequency determining means having a plurality of output terminals corresponding to the individual frequencies in each of said groups, a plurality of gates having a first and second input terminal and each gate being adapted to produce an output signal when both input terminals are energized, means connecting the first input terminal of each gate individually to a different output terminal of said frequency determining means, a timing circuit, means connecting the timing circuit to the output terminals of said frequency determining means in each of said chains, means further connecting said timing circuit to the second input terminals of said plurality of gates, said timing circuit adapted to be operated when one individual frequency in each of said groups is simultaneously detected by the frequency determining means, said timing circuit energizing said second terminal a predetermined interval after being operated, a register and means connecting said register to said plurality of gates, and bistable means connected between said register and said gates and adapted to be set to a first state when the particular gate produces an output signal, said register adapted to register a decimal digit in accordance with the combination of bistable means in the first state.

4. A device as defined in claim 3 wherein the frequency determining means comprise means for producing individual pulses corresponding to the presence of an individual frequency after the reception of one period of the individual frequency.

5. A device as defined in claim 3 wherein said timing circuit comprises two first means adapted to produce an output when one or more input terminals are energized, means connecting one of said first means to the output terminals of the frequency determining means in one chain, and means connecting the other of said first means to the output terminals of the frequency determining means in the other chain, a first gate adapted to produce an output signal when the input terminals are energized, means connecting said first gate to said first means, a pulse generator adapted to produce a pulse of predetermined width after being energized, means connecting said pulse generator to said first gate and to the second input terminal of said plurality of gates, said pulse generator being adapted to energize said second terminal after producing said pulse.

6. A device as defined in claim 3 including inhibit means connected to said timing circuit and the output terminals of said frequency determining means and adapted to inhibit said timing circuit if more than one frequency is detected simultaneously in each chain.

7. A device as defined in claim 5 having inhibiting means connected to said first gate and comprising a second means connected to the output terminal of the frequency determining means in one chain and a second means connected to the output terminals in said second chain, said second means adapted to render said first gate inoperative when at least two output terminals of either frequency determining means are energized simultaneously.

8. A device as defined in claim 5 including means connected to both of said first means and said bistable means and adapted to set said bistable means to the second state when either of said first means are de-energized.

9. In a telephone central office a multifrequency receiver for converting a frequency coded decimal digit discretely represented by the concurrence of one frequency from each of two groups comprising two parallel chains, each of said chains containing frequency determining means therein to detect the individual frequencies in a different one of said group of frequencies, said frequency determining means having a plurality of output terminals associated with the individual frequencies in the respective groups of frequencies and each frequency determining means being adapted to produce a pulse train at a particular output terminal after the reception of one period of the individual frequency, a plurality of integrators adapted to produce an output signal of constant amplitude when energized by a pulse train, means connecting said plurality of integrators individually to different ones of said output terminals, a plurality of gates having a first and second input terminal and each adapted to produce an output signal when both input terminals are energized, means connecting said first input terminal of each gate individually to different ones of said plurality of integrators, a timing circuit, means connecting said timing circuit to said plurality of integrators and to the second input terminals of said plurality of gates, said timing circuit adapted to be operated when one individual frequency in each of said groups of frequencies is detected by the frequency determining means, said timing circuit being further adapted to energize said second terminals a predetermined interval after being operated, inhibit means connected between said timing circuit and said integrators and adapted to inhibit said timing circuit if more than one individual frequency is detected by each frequency determining means simultaneously, a register and means connecting said register to the output of said plurality of gates, and bistable means connected between said register and said gates and adapted to be set to a first state when the particular gate produces an output signal, said register adapted to register a decimal digit in accordance with the combination of bistable means in the first state.

10. In a telephone central office a multifrequency receiver for converting a frequency coded decimal digit discretely represented by the concurrence of one individual frequency from each of two different groups of frequencies comprising two parallel chains, each of said chains containing a frequency determining means therein to detect the individual frequencies in a different one of said group of frequencies, each of said frequency determining means comprising tapped delay lines, a first tap at the input to the delay lines and a plurality of second taps being placed at intervals representative of a delay of one period of the individual frequencies, a plurality of series circuits comprising a limiter and a pulse generator, means connecting said first tap and the plurality of second taps individually to different ones of said plurality of series circuits, a first plurality of gates having a first and a second input terminal and each adapted to produce an output pulse when both input terminals are energized simultaneously, means connecting the first terminal of said first plurality of gates individually to different ones of each of the series circuits connected to the plurality of second taps, means connecting the second terminal of said first plurality of gates individually to the series circuit connected to said first tap, said output pulse being representative of the detected frequency, a plurality of integrating means each connected individually to different ones of said first plurality of gates and each adapted to produce an output signal of constant amplitude when energized by a train of pulses, a second plurality of gates having a first and a second input terminal and each adapted to produce an output signal when both input terminals are energized, means connecting said first input terminal of each of said second plurality of gates individually to different ones of said plurality of integrators, a timing circuit, means connecting said timing circuit to said plurality of integrators, means further connecting said timing circuit to the second input terminals of said second plurality of gates, said timing circuit adapted to be operated when one individual frequency in each of said group of frequencies is detected by the frequency determining means, said timing circuit energizing said second terminal a predetermined interval after being operated, a register and means connecting said register to the output of said second plurality of gates, said register adapted to register a decimal digit in accordance with the combination of output signals from said second plurality of gates.

11. In a telephone central office a multifrequency receiver for converting a frequency coded decimal digit discretely represented by the concurrence of one individual frequency from each of two different groups of frequencies comprising two parallel chains, each of said chains containing frequency determining means therein to detect the individual frequencies in a different one of said groups of frequencies, each of said frequency determining means having a plurality of output terminals associated with the individual frequencies in each of said groups, said frequency determining means being adapted to produce a train of pulses at a particular output terminal after the reception of one period of that particular individual frequency, a plurality of integrators, means connecting said plurality of integrators individually to different ones of said output terminals and each integrator being adapted to produce an output signal of constant amplitude when energized by the train of pulses, a plurality of gates having a first and a second input terminal and each adapted to produce an output signal when both input terminals are energized, means connecting the first input terminal of each gate individually to different ones of said plurality of integrators, a timing circuit comprising two first means adapted to produce an output when one or more input terminals are energized, means connecting one of said first means to the plurality of integrators in one chain and means connecting the other of said first means to the plurality of integrators in the other chain, a first gate adapted to produce an output when the input terminals are energized, means connecting the first means and said first gate, and a monostable device adapted to produce a pulse of predetermined width after being energized, means connecting said monostable device to said first gate and to the second input terminals of said plurality of gates, said monostable device energizing said second terminals after producing said pulse, inhibit means adapted to inhibit said first gate if more than one frequency is detected in each group simultaneously, means connecting said inhibit means to said plurality of integrators and to said first gate, and means connected between said first gate and said monostable device and adapted to de-energize said monostable device for a time interval greater than the interval between the astable and the stable state of said monostable device.

12. A multifrequency receiver for converting a frequency coded decimal digit discretely represented by the concurrence of one individual frequency from each of two groups of frequencies comprising two parallel chains, each of said chains containing a frequency determining means therein to detect the individual frequencies in different ones of said groups, each of said frequency determining means containing a tapped delay line, a first tap at the input of the delay line and a plurality of second taps being placed at intervals corresponding to a delay of one period of the individual frequencies, a plurality of series circuits comprising a limiter and a pulse generator, means connecting said first tap and the plurality of said second taps individually to different ones of said plurality of series circuits, a first plurality of gates having a first and a second input terminal and each adapted to produce an output pulse when both input terminals are energized simultaneously, means connecting the first input terminal of said first plurality of gates individually to different ones of the series circuits connected to the plurality of said second taps, means connecting the second terminal of said first plurality of gates to the series circuit connected to said first tap, the output pulse being representative of the detected frequencies, a second plurality of gates having first and second input terminals and each adapted to produce an output signal when both input terminals are energized simultaneously, means connecting the first input terminal of each of said second plurality of gates individually to different ones of said first plurality of gates, a timing circuit comprising two first means adapted to produce an output signal when one or more input terminals are energized, means connecting one of said first means to the first plurality of gates in one chain and means connecting the other of said first means to the first plurality of gates in the other chain, a third gate adapted to produce an output when the input terminals are energized, means connecting said third gate to said first means, and a monostable device adapted to produce a pulse of predetermined width, means connecting said monostable device to said third gate and to the second input terminal of said second plurality of gates, said monostable device being adapted to energize said second terminal after producing said pulse, inhibit means connected to said third gate comprising second means connected to the first plurality of gates in one chain and third means connected to the first plurality of gates in the other chain, said second and third means adapted to render said third gate inoperative when at least two output terminals of the respective frequency determining means are energized simultaneously, and means connected between said third gate and said monostable device and adapted to de-energize said monostable device for a time interval greater than the interval of time of reversion of the monostable device from the astable to the stable state, a register and means connecting said register to the output of said second plurality of gates, and a plurality of bistable means individually connected between said register and said gates and adapted to be set to a first state when a particular gate produces an output signal, said register adapted to register a decimal digit in accordance with the combination of bistable means in the first state in each chain.

No references cited.